(12) United States Patent
Tanaka

(10) Patent No.: US 8,077,169 B2
(45) Date of Patent: Dec. 13, 2011

(54) INFORMATION PROCESSING DEVICE AND CONTROL METHOD

(75) Inventor: Dai Tanaka, Shiojiri (JP)

(73) Assignee: Seiko Epson Corporation (JP)

( * ) Notice: Subject to any disclaimer, the term of this patent is extended or adjusted under 35 U.S.C. 154(b) by 809 days.

(21) Appl. No.: 11/893,408

(22) Filed: Aug. 16, 2007

(65) Prior Publication Data

US 2008/0043028 A1    Feb. 21, 2008

(30) Foreign Application Priority Data

Aug. 17, 2006  (JP) ................................. 2006-222568
Jun. 7, 2007   (JP) ................................. 2007-151833

(51) Int. Cl.
  *G09G 5/00*    (2006.01)
(52) U.S. Cl. ........................................ 345/208; 345/168
(58) Field of Classification Search ................... 345/97, 345/168, 208; 715/781, 788
  See application file for complete search history.

(56) References Cited

U.S. PATENT DOCUMENTS

| | | | | |
|---|---|---|---|---|
| 6,049,366 A | * | 4/2000 | Hakemi et al. ................... | 349/86 |
| 6,300,933 B1 | * | 10/2001 | Nagasaki et al. ............. | 345/685 |
| 6,489,950 B1 | * | 12/2002 | Griffin et al. .................. | 345/168 |
| 6,888,522 B1 | * | 5/2005 | Shibata et al. .................. | 345/87 |
| 2003/0085863 A1 | * | 5/2003 | Ma .................................. | 345/97 |
| 2004/0158494 A1 | * | 8/2004 | Suthar ............................. | 705/15 |
| 2006/0007129 A1 | * | 1/2006 | Pletikosa ....................... | 345/156 |

FOREIGN PATENT DOCUMENTS

| | | |
|---|---|---|
| EP | 0 265 011 | 4/1988 |
| JP | 06-102997 | 4/1994 |
| JP | 2571793 | 10/1996 |

\* cited by examiner

*Primary Examiner* — Quan-Zhen Wang
*Assistant Examiner* — Calvin C Ma
(74) *Attorney, Agent, or Firm* — Harness, Dickey & Pierce, P.L.C.

(57) ABSTRACT

There is disclosed an information processing device with an operator unit capable of providing adequate operationality for both of display devices or drive modes which respectively require different rewrite times. The information processing device includes: at least one display device; an operator unit that is displaced from a reference point; a displacement detection unit that detects a displacement amount of the operator unit; a signal supply unit that supplies the at least one display device with a control signal for changing display on the at least one display device, depending on the displacement amount detected by the displacement detection unit; and a load controller that controls a load applied to the operator unit, depending on a display rewrite time per unit information amount in the at least one display device.

14 Claims, 13 Drawing Sheets

INFORMATION PROCESSING DEVICE AND CONTROL METHOD

The entire disclosures of Japanese Patent Applications No. 2006-222568 filed on Aug. 17, 2006 and No. 2007-151833 filed on Jun. 7, 2007 are expressly incorporated by reference herein.

BACKGROUND

1. Technical Field

The present invention relates to an information processing device having an operator unit.

2. Related Art

Many of the devices having on-board displays tend to be equipped with a rotary operator unit such as a jog dial (registered trademark). A rotary operator unit is constituted of a rotor which rotates about an axis, and a sensor which detects and converts a rotation angle and a rotation amount of the rotor into signals. A device to be operated by the rotary operator unit changes data displayed as a reference so as to be slidable depending on a rotation amount. An operator who operates such a device turns the rotary operator unit quickly at first, to gain a wide span, and then turns the unit slowly when desired data becomes proximate. In this manner of operation, the operator can efficiently find out the data to be presented on a display from a large amount of data including a combination of different types of data.

JP-B-2571793 and JP-A-6-102997 are publications each of which, discloses a mechanism for improving operationality of an operator unit. An input device disclosed in the former publication employs a touch sensor. The touch sensor is triggered to vibrate when a selector icon on a display overlaps a selectable unit. The latter publication discloses a mouse which employs a cover drive mechanism for driving up and down a mouse cover. The height of this mouse cover is controlled depending on the type of a unit which is overlapped by a selector icon on a display.

Recent developments have been made on a display device using a memorable display medium, which is called an electronic paper. A memorable display medium can maintain a state of display without application of a voltage, and accordingly attains an effective feature of performing display with low power consumption. Examples of such a memorable display medium are cholesteric liquid crystal or electrophoretic display.

Memorable media commonly have a defective feature in that a longer time is required to complete a refresh operation as compared with non-memory type display media. One approach to resolving this defect is considered to reside in the employment of a non-memory type display medium such as TN (Twisted Nematic) liquid crystal provided in an electronic paper. An alternative approach is to allow a memorable display medium to run even in a drive mode for fast rewrite with low display quality, in addition to a normal drive mode for slow rewrite with high display quality. In any case, it is difficult for techniques described in both of the above publications to provide adequate operationality for display devices or drive modes between which a rewrite time differs.

SUMMARY

The invention provides an operator unit capable of ensuring adequate operationality in display devices or drive modes between which time required for rewriting differs.

According to an aspect of the invention, there is provided an information processing device including: at least one display device; an operator unit that is displaced from a reference point; a displacement detection unit that detects a displacement amount of the operator unit; a signal supply unit that supplies the at least one display device with a control signal for changing display on the at least one display device, depending on the displacement amount detected by the displacement detection unit; and a load controller that controls a load applied to the operator unit, depending on a display rewrite time per unit information amount in the at least one display device.

In the information configured as described above, the load applied to the operator unit is controlled depending on display rewrite times per unit information amount of the display device.

Alternatively, the information processing device may include a plurality of display devices having respectively different display speeds, wherein the signal supply unit supplies the control signal to one of the plurality of display devices, and the load controller controls the load applied to the operator unit, depending on the one of the plurality of display devices as a destination to which the control signal is supplied.

In the information processing device configured as described above, the load applied to the operator unit is controlled depending on the destination to which the control signal is supplied.

Further alternatively, in the information processing device, the load controller controls the load applied to the operator unit so that the load decreases as a rewrite speed of one of the plurality of display devices, as the destination, increases.

In the information processing device configured as described above, the load applied to the operator unit is controlled so that the load decreases as the rewrite speed of the display device increases.

Also alternatively, in the information processing device, one of the at least one display device can be driven in a plurality of drive modes respectively having different display rewrite times per unit information amount, and the load controller controls the load applied to the operator unit, depending on one of the plurality of drive modes in which the one of the at least one display device is driven.

In the information processing device configured as described above, the load applied to the operator unit is controlled depending on the drive mode of the display device.

Further alternatively, in the information processing device, the load controller controls the load applied to the operator unit so that the load applied to the operator unit decreases as a rewrite speed of the one of the at least one display device which is driven in the one of the plurality of drive modes increases.

In the information processing device configured as described above, the load applied to the operator unit is controlled so that the load decreases as the rewrite speed of the display device increases.

Further alternatively, in the information processing device, the one of the at least one display device includes a display medium using cholesteric liquid crystal, and the plurality of drive modes includes drive modes based on a DDS (Dynamic Drive Scheme) and a conventional scheme.

In the information processing device configured as described above, the load applied to the operator unit is controlled depending on whether the drive mode of the display device is of a DDS or a conventional scheme.

Also alternatively, in the information processing device, the load is a force which hinders displacement of the operator unit.

In the information processing device configured as described above, a force which hinders displacement of the operator unit is controlled depending on the display rewrite time per unit information amount of the display device.

Further alternatively, in the information processing device, the load is a displacement amount which is required to trigger rewrite of a unit information amount of the display on the display device.

In the information processing device configured as described above, the displacement amount which is required to trigger rewrite of a unit information amount of display on the display device is controlled depending on the display rewrite time per unit information amount of the display device.

Also alternatively, in the information processing device, the signal supply unit outputs an instruction about a rewrite of the display on the at least one display device each time the displacement amount detected by the displacement detection unit exceeds a threshold.

In the information processing device configured as described above, a control signal indicative of an instruction about rewrite of display on the display device is supplied each time the displacement amount exceeds a threshold.

Also alternatively, in the information processing device, the at least one display device includes a display medium using cholesteric liquid crystal.

In the information processing device configured as described above, the load applied to the operator unit is controlled depending on the display rewrite time per unit information amount of the at least one display device including the display medium using cholesteric liquid crystal.

Also alternatively, the information processing device further includes a light emitting unit that emits light, synchronized with timing at which the control signal is supplied to the at least one display device.

Also alternatively, the information processing device further includes an audio output unit that outputs a sound, synchronized with timing at which the control signal is supplied to the at least one display device.

In the information processing devices configured as described above, light or a sound is outputted synchronized with supply timing of the control signal.

Also alternatively, in the information processing device, the operator unit is of a type which turns about an axis, and the displacement amount is a rotation amount of the operator unit.

In the information processing device configured as described above, the load applied to the operator unit is controlled depending on the display rewrite time per unit information amount of the display device.

According to another aspect of the invention, there is provided a control method for use in an information processing device including at least one display device, an operator unit that is displaced from a reference point, a displacement detection unit that detects a displacement amount of the operator unit, and a signal supply unit that supplies the at least one display device with a control signal for changing display on the at least one display device, depending on the displacement amount detected by the displacement detection unit, the control method including controlling a load applied to the rotator unit, depending on a display rewrite time per unit information amount in the at least one display device, wherein the signal supply unit supplies the control signal for changing the display on the at least one display device, depending on a rotation amount detected by a rotation detection unit.

In the control method configured as described above, the load applied to the operator unit is controlled depending on the display rewrite time per unit information amount of the display device.

BRIEF DESCRIPTION OF THE DRAWINGS

The invention will be described with reference to the accompanying drawings, wherein like numbers refer to like units.

DESCRIPTION OF EXEMPLARY EMBODIMENTS

1. First Embodiment

The first embodiment of the invention will now be described. In this embodiment, an image which should be displayed on a display device of an information processing device is selected by a rotary operator unit. The display device is driven in one of two drive modes, i.e., a mode of prioritizing image quality and a mode of prioritizing drive speed. Load applied to the rotary operator unit is controlled according to the drive modes.

Figure 1:
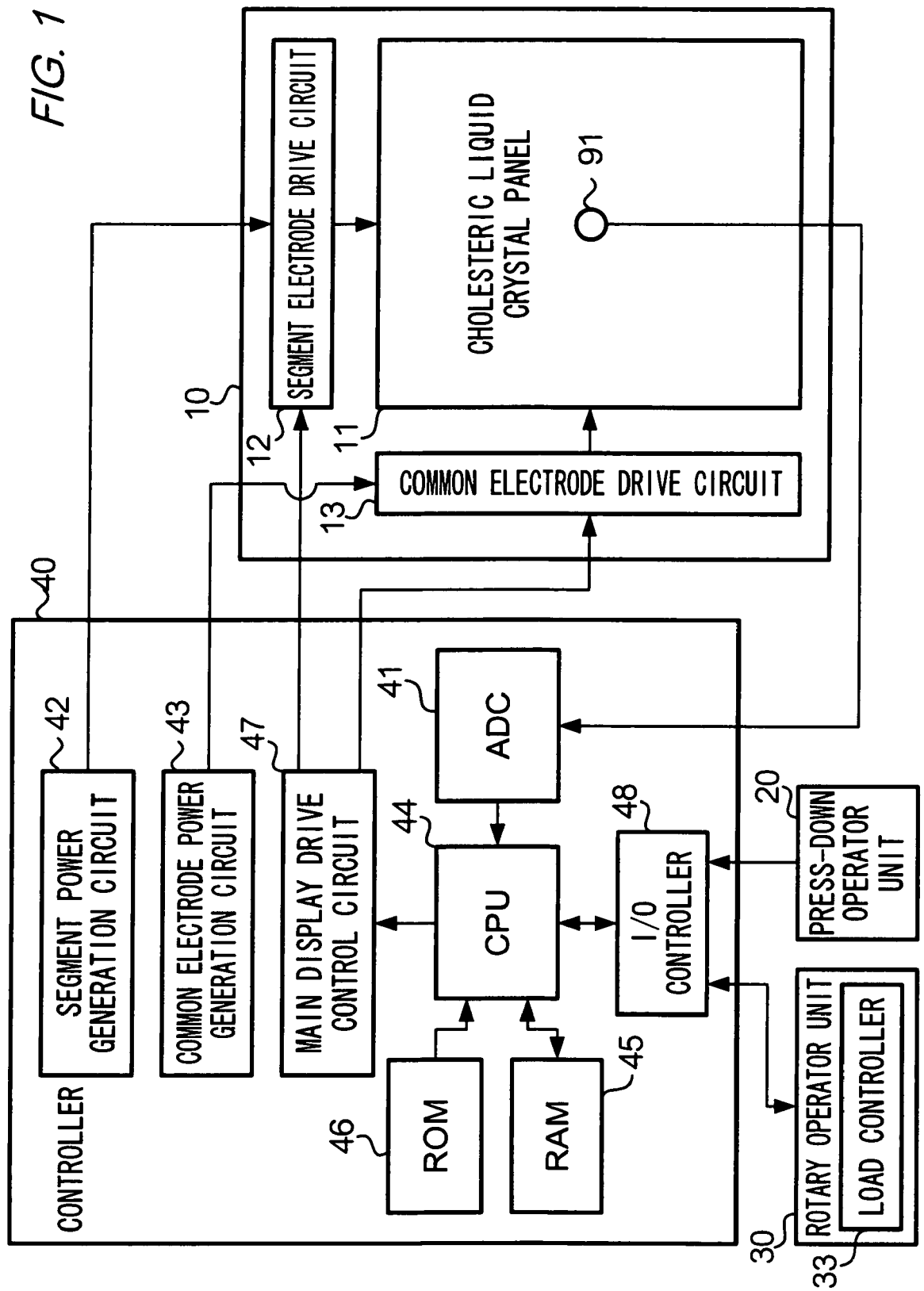
FIG. 1 shows a schematic hardware structure of a liquid crystal display device.
Figure 2:
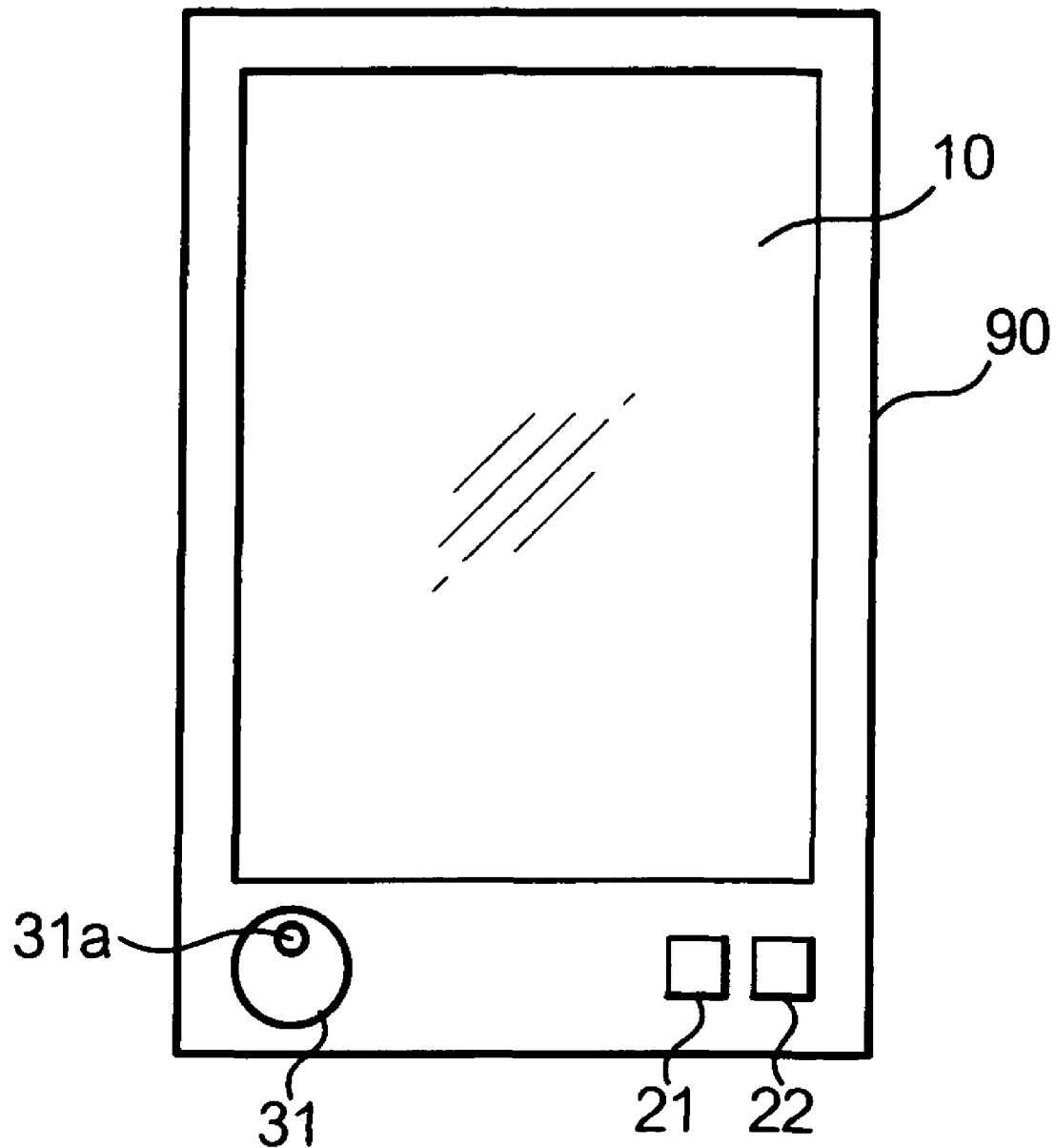
FIG. 2 shows an appearance of the liquid crystal display device.

FIG. 1 shows a schematic hardware structure of the information processing device according to the first embodiment. FIG. 2 shows an appearance of the information processing device. As shown in FIG. 1, this information processing device has a main display 10 (display device), a press-down operator unit 20, a rotary operator unit 30, and a controller 40 for controlling these components.

The main display 10 includes a cholesteric liquid crystal panel 11, a segment electrode drive circuit 12, and a common electrode drive circuit 13. The cholesteric liquid crystal panel 11 has a structure in which a cholesteric liquid crystal layer is sandwiched between two glass substrates from up and down sides. The two glass substrates are provided with transparent electrodes. A temperature sensor 91 is bonded to a substantially central position of the lower face of the lower one of the two glass substrates. In the information processing device according to the first embodiment, an image is displayed under control of the controller 40. Specifically, the controller 40 causes the cholesteric liquid crystal layer to vary orientation states of itself by controlling the segment electrode drive circuit 12 and common electrode drive circuit 13 so as to apply predetermined voltages between transparent electrodes of both glass substrates of the cholesteric liquid crystal panel 11.

Each of FIG. 3 show a cross section of the cholesteric liquid crystal panel 11 along with an orientation state of cholesteric liquid crystal. The cholesteric liquid crystal panel 11 includes an upper glass substrate 14, upper transparent electrodes 15, a cholesteric liquid crystal layer 16, lower transparent electrodes 17, a lower glass substrate 18, and a light absorption plate 19. The transparent electrodes 15 and 17 function as data electrodes and scanning electrodes for applying voltages to the cholesteric liquid crystal layer 16. As shown in FIG. 2, the upper glass substrate 14 of the cholesteric liquid crystal panel 11 is exposed outside through an opening part in a casing 90 of the display device.

Figure 4:
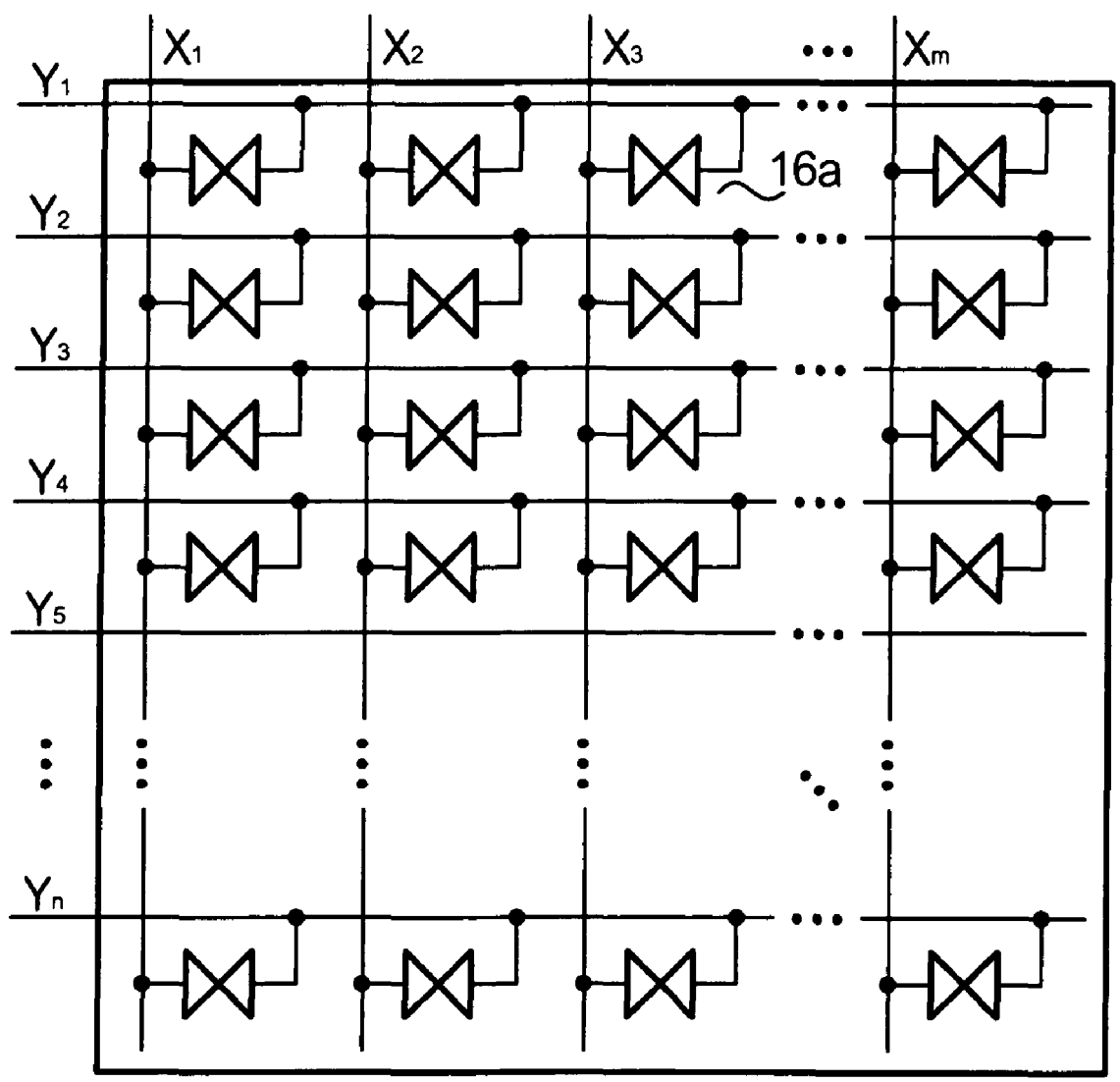
FIG. 4 shows scanning lines and data lines.

FIG. 4 shows a structure of the cholesteric liquid crystal panel 11. The cholesteric liquid crystal panel 11 has an n×m matrix wiring which includes n rows of scanning electrodes ($Y_1, Y_2, \ldots, Y_n$) and m columns of data electrodes ($X_1, X_2, \ldots, X_m$). In this case, n and m are positive integers. In the first embodiment, the cholesteric liquid crystal panel 11 is a so-called passive matrix display device, and therefore, scanning and data electrodes can respectively function as scanning lines and data lines. At regions where the scanning and data electrodes intersect each other (intersections between the scanning and data electrodes), electro-optical units 16a are formed. Each of the electro-optical units 16a has two electrodes and an electro-optical layer sealed between the two electrodes (wherein the two electrodes are a data electrode (also called a pixel electrode or segment electrode) and a scanning electrode (also called a common electrode)). This embodiment utilizes, as the electro-optical layer, a liquid crystal layer including cholesteric liquid crystal which is a memorable liquid crystal. The memorable liquid crystal refers to a liquid crystal capable of maintaining a display state without supply of electric power. Each of electro-optical units 16a are applied with a voltage depending on a voltage (hereinafter a "scanning voltage") applied to a related scanning electrode and on a voltage (hereinafter a "data voltage") applied to a related data electrode. A voltage applied to each electro-optical layer is referred to as a "drive voltage". Optical characteristics of the electro-optical layers (e.g., optical rotation, light scattering, and the like) vary depending on applied voltages. The electro-optical units 16a form an image owing to variation of optical characteristics of the electro-optical layers. Basically, one electro-optical unit 16a corresponds to one pixel. In case of a color display which achieves color expression on RGB color coordinate system, one electro-optical unit 16a corresponds to one of R, G, and B color components included in one pixel.

Figure 3C:
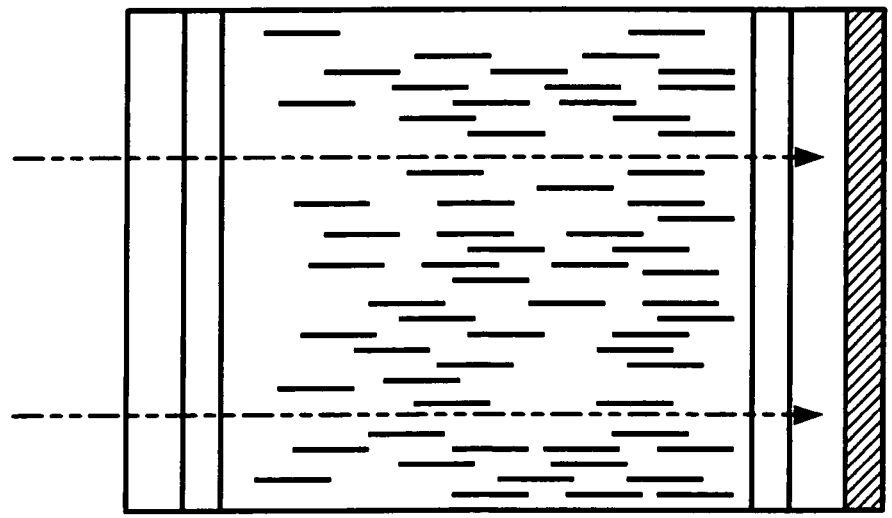
FIGS. 3A, 3B, and 3C each show a cross-section of a cholesteric liquid crystal panel.
Figure 3B:
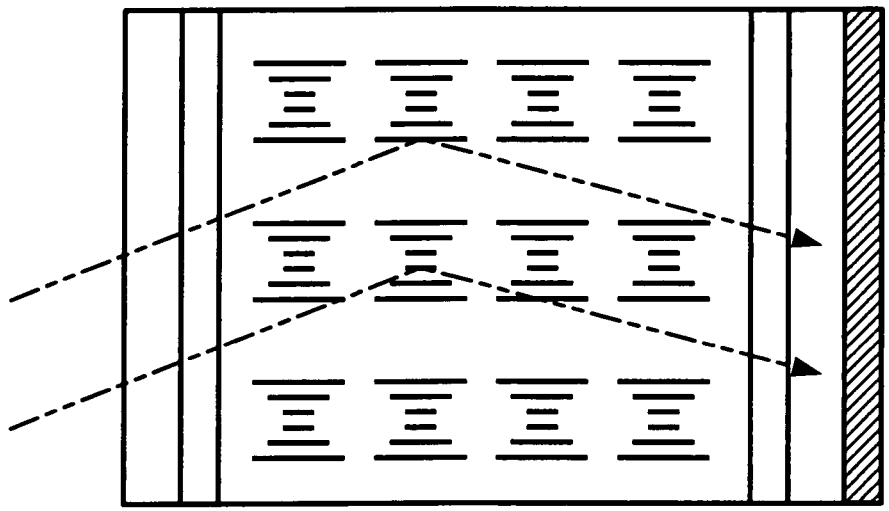
Figure 3A:
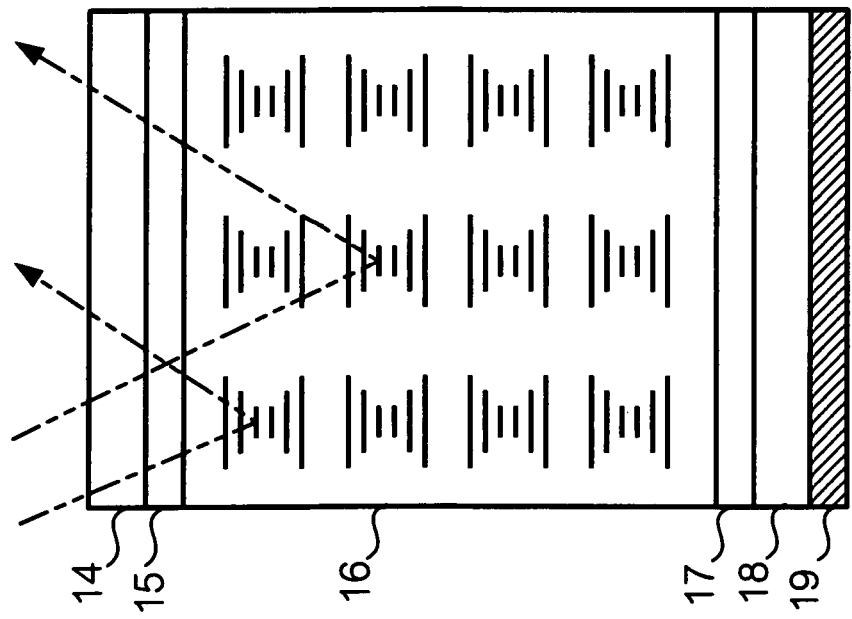

In FIG. 3, the orientation state (of cholesteric crystal) in an electro-optical unit 16a transits between a planar orientation (hereinafter "P-orientation") shown in FIG. 3A, a focal conic orientation (hereinafter "F-orientation") shown in FIG. 3B, and a homeotropic orientation (hereinafter "H-orientation") shown in FIG. 3C. In the P-orientation state, light entering from the upper glass substrate 14 is reflected thereby expressing white. Inversely, in the F-orientation state, the entering light is absorbed and reaches the light absorption plate 19 thereby expressing black. By transiting the orientation state to an intermediate orientation state between the P-orientation and the H-orientation, an intermediate tone can be expressed. Once the orientation state transits to the P- or H-orientation, the P- or H-orientation is maintained without application of a voltage. As will be described in detail later, switching from the P-orientation to the F-orientation always needs to go through the H-orientation as a temporary transitional stage, which cannot be maintained without application of a voltage.

In FIG. 1, the press-down operator unit 20 and rotary operator unit 30 are to allow users to make various input operations. Both of the operator units will now be described in detail below. The press-down operator unit 20 is to convert a user's press-down operation into a signal. The press-down operator unit 20 includes two buttons 21 and 22, and a sensor (not shown) which detects press-down of the buttons 21 and 22. As shown in FIG. 2, the buttons 21 and 22 of the press-down operator unit 20 are exposed to the outside of the casing 90 of the display device.

Figure 5:
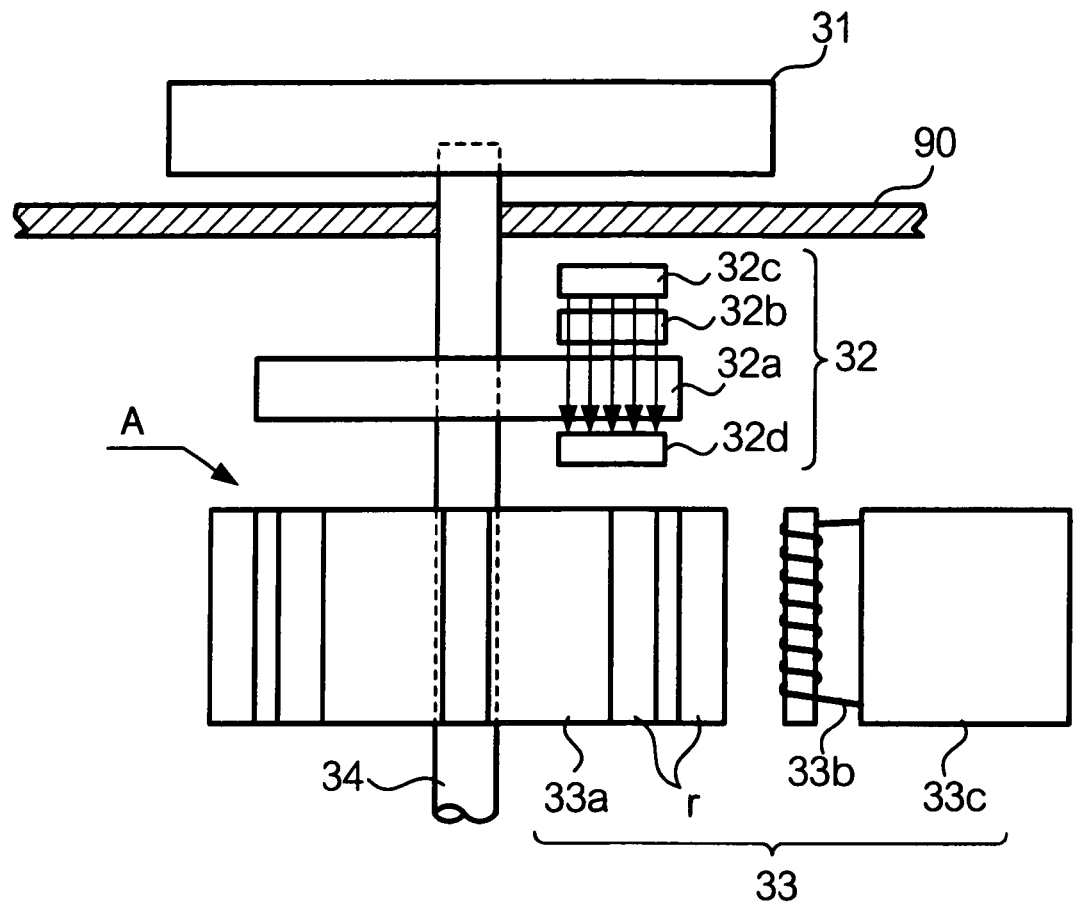
FIG. 5 shows a structure of a rotary operator unit.
Figure 6:
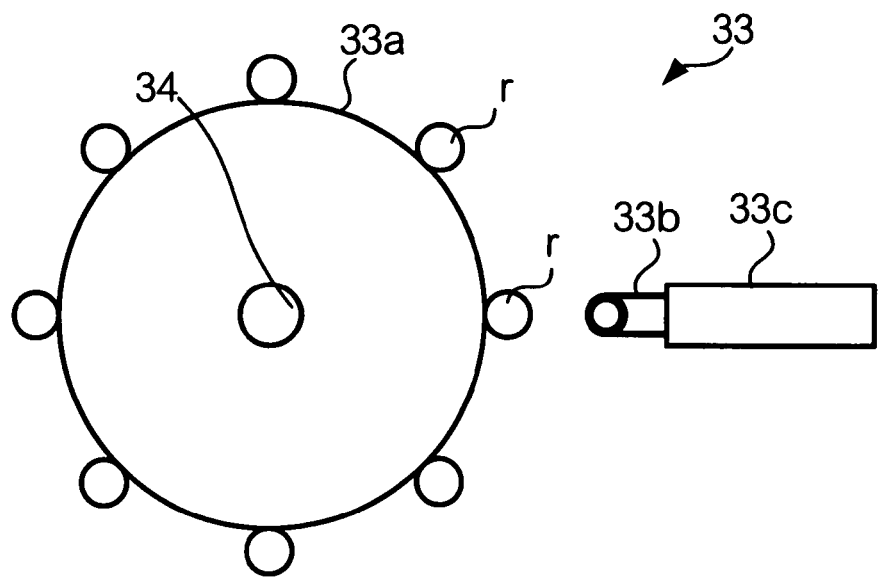
FIG. 6 also shows a structure of the rotary operator unit.

FIG. 5 is a side view of the rotary operator unit 30. FIG. 6 is a top view of a face denoted by an arrow A in FIG. 5. The rotary operator unit 30 is designed to convert user's rotational operation into a signal. As shown in the figures, the rotary operator unit 30 includes a rotary knob 31, a rotary encoder 32, a load controller 33, and a rotary shaft 34 which links these components to one another. The rotary knob 31 has a flat cylindrical shape. A hole is cut in upward from the substantial center of a lower end face of the rotary knob 31. An upper end of the rotary shaft 34 is inserted in the hole. In this manner, the rotary shaft 34 is fixed to the rotary knob 31. As shown in FIG. 2, the rotary knob 31 is exposed to the outside of the casing 90 of the display device. A mark 31a indicative of a rotation reference position is marked on an upper end face of the rotary knob 31.

The rotary encoder 32 has a rotary slit disc 32a, a fixed plate 32b, a light emitting unit 32c, and a light receiving unit 32d. The light emitting unit 32c and light receiving unit 32d sandwich both of the disc 32a and plate 32b. The rotary slit disc 32a has a through hole in the center of the disc itself. The rotary shaft 34 is inserted into the through hole so that the rotary slit disc 32a is fixed to the rotary shaft 34. Slits having a so-called absolute pattern is formed in the rotary slit disc 32a. The fixed plate 32b is fixed to the upper face of the rotary slit disc 32a. The fixed plate 32b has plural holes extending parallel to a line extending radially from the rotary shaft 34. The light emitting unit 32c has the same number of LEDs (Light Emitting Diodes) as the holes in the fixed plate 32b. The LEDs are fixed, arranged exactly above the holes of the fixed plate 32b. The light receiving unit 32d has the same number of optical sensors as the number of LEDs. The optical sensors are arranged at positions where the sensors can receive light passing though the fixed plate 32b and the rotary slit disc 32a. There is prepared a table in which angles of the rotary slit disc 32a are related to binary data indicative of combinations of presence or absence of light received by the optical sensors. By referring to this table at respective necessary occasions, rotation angles of the rotary slit disc 32a can be specified based on a light receiving condition.

The load controller 33 includes a rotation hindering member 33a, an electromagnet 33b, and a magnetic force control circuit 33c. The rotation hindrance member 33a includes a substantially cylindrical base material, and eight permanent magnets r which are fixed to the side wall of the base material, arranged at substantially equal intervals. The electromagnet 33b has an iron core and a coil wound around the iron core.

The electromagnet 33b generates a magnetic force corresponding to electric power supplied by the magnetic force control circuit 33c, so as to act on the rotation hindrance member 33a. Therefore, as the magnetic force is reduced, rotational load applied to the rotary knob 31 is reduced. Inversely, as the magnetic force is increased, rotational load applied to the rotary knob 31 is increased.

Figure 7:
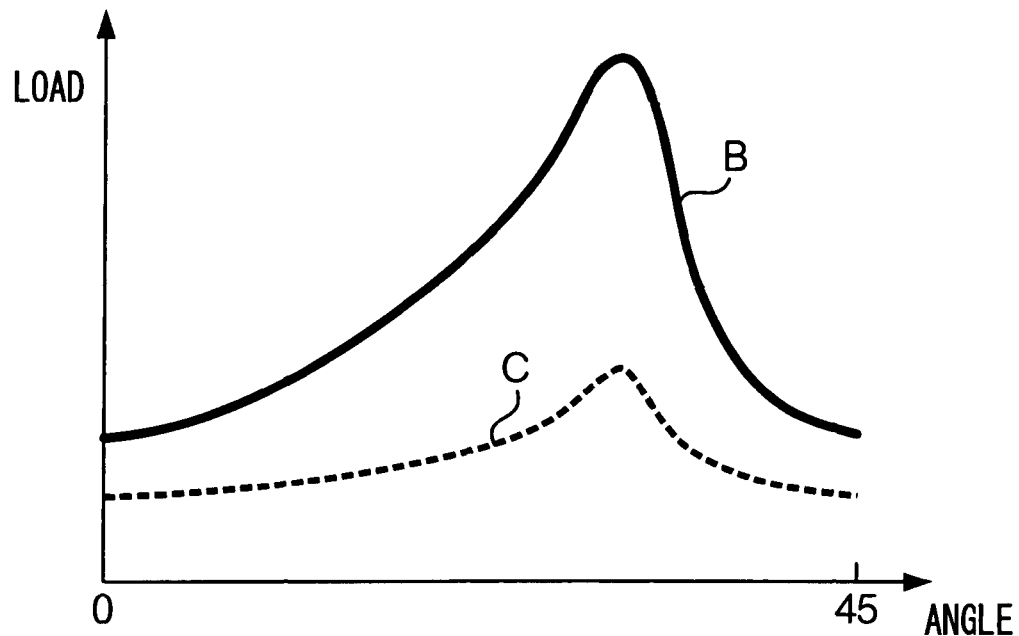
FIG. 7 is a graph showing transitions of loads (torque) of a rotary knob.

FIG. 7 is a graph showing load-angle curves of the electromagnet 33b. FIG. 7 shows an example in which the rotary knob 31 is rotated to 45 degrees in a state of strong magnetic force (curve B) and a state of weak magnetic force (curve C). That is, in these two states, the rotary knob 31 is rotated so that one permanent magnet r attracted by the electromagnet 33b is forced away from the electromagnet 33b until a next permanent magnet r comes attracted. According to FIG. 7, the load gradually increases from the beginning of rotation operation and steeply decreases from a time point when a particular angle is reached, regardless of strength or weakness of the magnetic force. Further, the load denoted by a solid curve B in the state of strong magnetic force is higher than the load denoted by a chain curve C in the state of weak magnetic force. Thus, with the load in the state of strong magnetic force, users find it more difficult to turn the rotary knob 31 than with the other load.

Returning to FIG. 1, the controller 40 includes an ADC (Analog/Digital Converter) 41, a segment power generation circuit 42, a common electrode power generation circuit 43, a CPU 44, a RAM 45, a ROM 46, a main display drive control circuit 47, and an I/O controller 48.

The ADC 41 converts an analog signal output from the temperature sensor 91, as a detected temperature, into a digital signal. The ADC 41 supplies the CPU 44 with the digital signal which indicates the temperature at the substantially central position of the cholesteric liquid crystal panel 11. The segment power generation circuit 42 and common electrode power generation circuit 43 respectively supply electric power to the segment electrode drive circuit 12 and common electrode drive circuit 13.

The CPU 44 performs various processing calculations, using the RAM 45 as a work area. The ROM 46 stores various programs and tables described later. The I/O controller 48 controls exchanges of various signals between the CPU 44 and the press-down operator unit 20 and rotary operator unit 30.

Next, load setup processing and image switching processing according to the first embodiment will be described.

Figure 8:
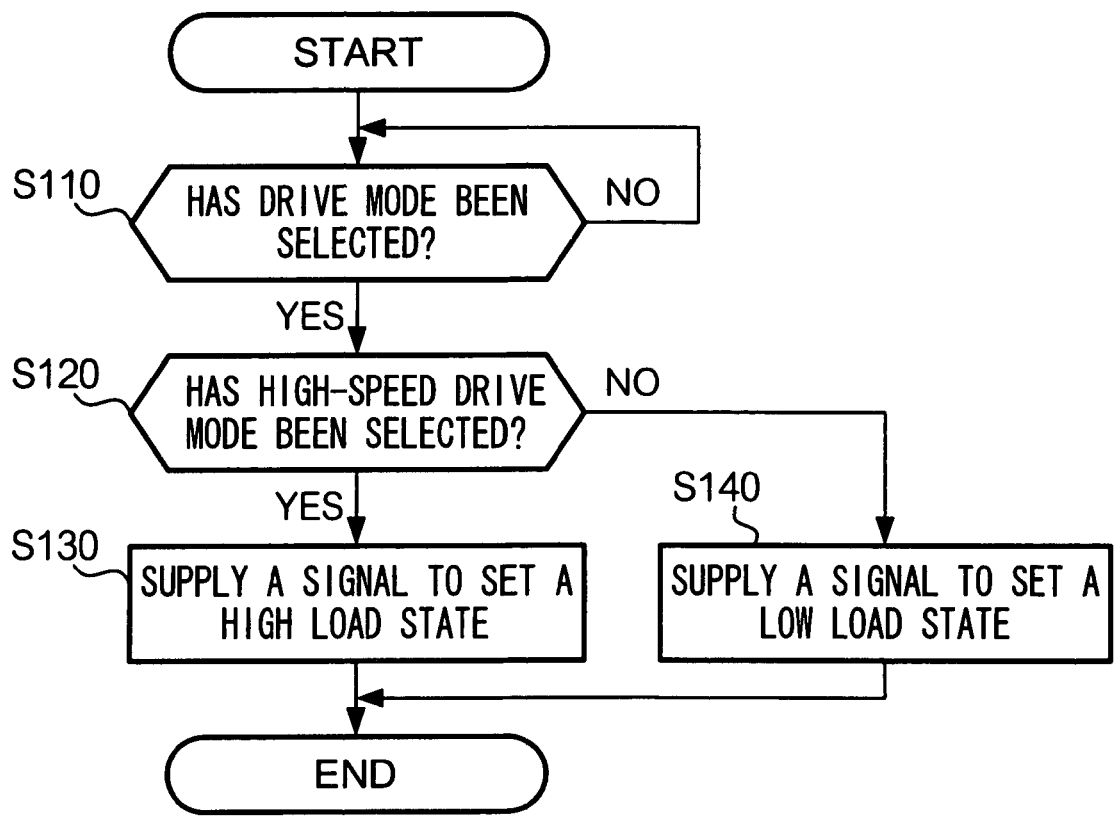
FIG. 8 is a flowchart showing load setup processing.

FIG. 8 is a flowchart showing the load setup processing. In case of the processing shown in FIG. 8, a user operates the press-down operator unit 20 to let the cholesteric liquid crystal panel 11 show a drive mode selection screen, and a drive mode is selected on the screen thereby to trigger the processing.

Figure 9:
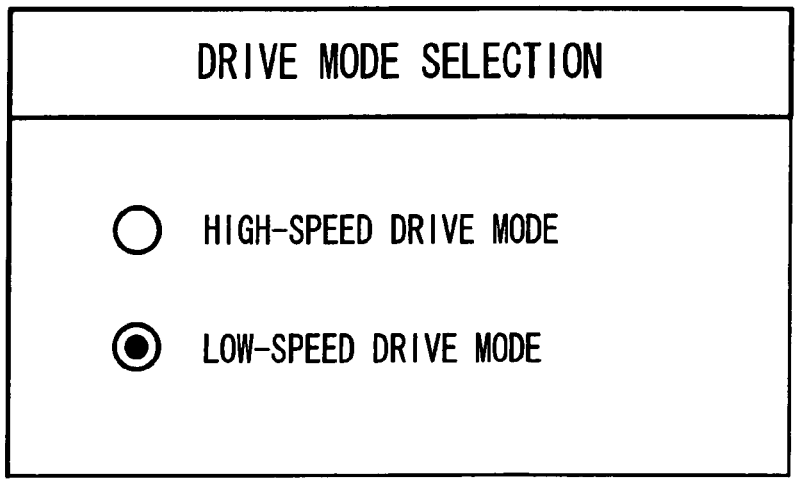
FIG. 9 shows a drive mode selection screen.

FIG. 9 shows the drive mode selection screen. This screen invites selection of either a high-speed drive mode or a low-speed drive mode. In the display device of the information processing device according to the first embodiment, the low-speed drive mode is a default mode. Therefore, when the screen is displayed first, the low-speed drive mode has been selected. In the low-speed drive mode, liquid crystal is driven according to a conventional drive scheme. This mode is desirable if image quality is given higher priority than drive speed. In the high-speed drive mode, liquid crystal is driven according to a DDS (Dynamic Drive Scheme). This mode is desirably selected if drive speed is given a higher priority than image quality.

The DDS and the conventional drive scheme will now be described below.

Figure 10:
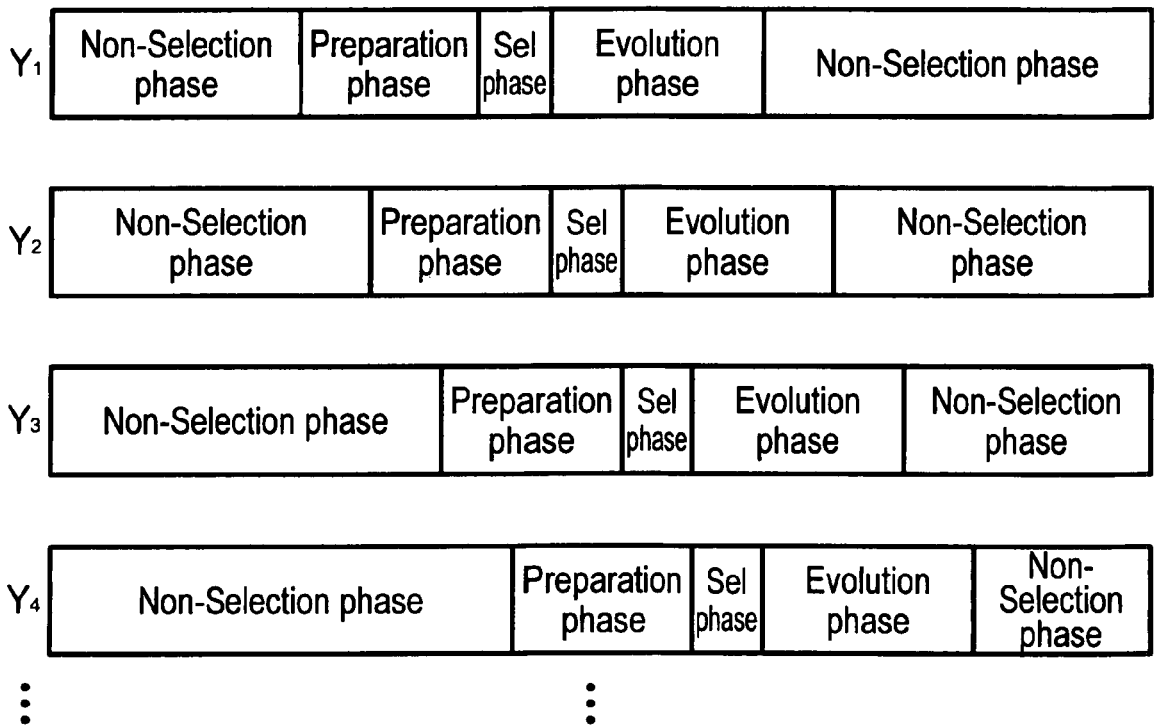
FIG. 10 depicts DDS drive cycles.

FIG. 10 shows examples of voltage application cycles. As shown in FIG. 10, according to the DDS, a drive cycle of cholesteric liquid crystal is divided into four stages, i.e., a preparation phase (or reset phase), a selection phase, an evolution phase (or hold phase), and a non-selection phase. Phases of these cyclic periods are shifted for each scanning line Y of an image and voltages specific to these periods are applied in a manner of pipelined-processing.

Drive voltages applied during the above periods respectively, will now be specifically described. At first, a drive voltage for transiting to the H-orientation state, all the electro-optical units 16a constituting a line as a target line to drive is applied during the preparation phase. During the selection phase, there is applied a drive voltage for selecting whether the electro-optical units 16a in the target line should be maintained in the H-orientation state or allowed to be relaxed to a transitional planar orientation state (hereinafter "TP-orientation") in which the spiral structure of liquid crystal is slightly relaxed. Further during the evolution phase, there is applied such a drive voltage as to maintain the orientation state of H-oriented electro-optical units 16a and as to transit P-oriented electro-optical units 16a to the F-orientation. During the non-selection phase, drive voltages are erased (though voltages are not strictly reduced to zero in some cases). Depending on the level of the drive voltage applied during the selection phase among these voltages, the orientation state of the cholesteric liquid crystal transits to either the P-orientation or F-orientation subsequently during the evolution phase (or hold phase) through the non-selection phase.

Figure 11:
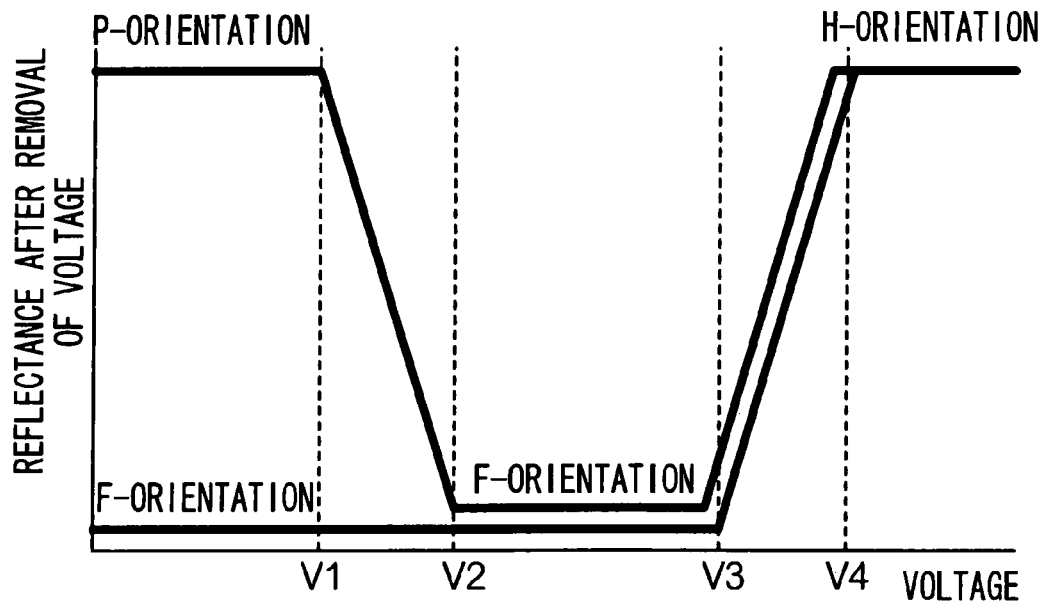
FIG. 11 is a graph showing relationships between drive voltages and transitions of orientation states.

FIG. 11 shows reflectance—voltage curves of the cholesteric liquid crystal. Specifically, FIG. 11 shows relationships between drive voltages applied to P-oriented and N-oriented cholesteric liquid crystal and orientation states to which the P- and N-oriented cholesteric liquid crystal transits after the drive voltages are removed rapidly. The vertical axis represents reflectances while the horizontal axis represents drive voltages. The voltages $V_1$ to $V_4$ are thresholds for drive voltages, at which orientation states transit. If the cholesteric liquid crystal is P-oriented, the orientation state gradually transits to the F-orientation while a drive voltage is applied increasing from $V_1$ to $V_2$. Accordingly, transparency increases and black appears finally as the color of the light absorption plate 19 itself. Further, the F-orientation is maintained while a drive voltage is applied varying from $V_2$ to $V_3$. While a drive voltage is applied varying from $V_3$ to $V_4$, the F-orientation transits to the H-orientation so that the reflectance accordingly increases again. On the other side, if the cholesteric liquid crystal is F-oriented, the orientation state does not transit while a drive voltage is applied varyingly from $V_1$ to $V_3$. While a drive voltage is applied further varyingly from $V_3$ to $V_4$, the F-orientation transits to the H-orientation, thereby increasing the reflectance. Thus, according to the DDS, the orientation states to which the cholesteric liquid crystal transits during periods successive to the preparation phase are decided depending on the level of the drive voltage applied to each of the electro-optical units 16a during the preparation phase.

Figure 12:
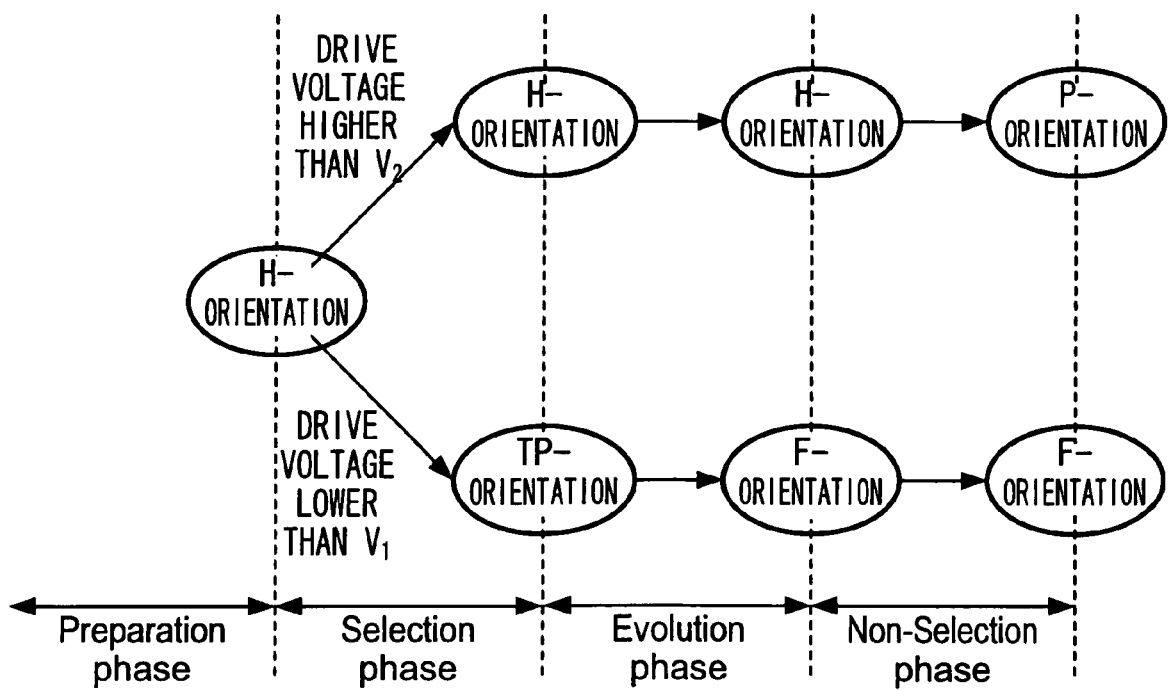
FIG. 12 shows relationships between drive voltages and transitions of orientation states.

FIG. 12 shows transition of orientation states of cholesteric liquid crystal. At first, during the preparation phase, a drive voltage of $V_4$ or higher is applied so that each electro-optical unit 16a which has been P- or F-oriented transits to the H-orientation. Further during the selection phase, each unit 16a is applied with a drive voltage corresponding to an orientation state specific to a color to be expressed. That is, when white is to be expressed a drive voltage of $V_2$ or higher is applied and when black is to be expressed a drive voltage of $V_1$ or lower is applied. If the drive voltage of $V_4$ or lower is applied, the orientation state first transits to the TP-orientation. Further during the evolution phase when a drive voltage of $V_4$ or lower is applied, the orientation state transits to the F-orientation, which is maintained up to the next drive cycle. Otherwise, if a drive voltage of $V_2$ or higher is applied during the selection phase, the H-orientation is maintained unchanged. Successively, during the evolution phase, a drive voltage capable of maintaining the H-orientation is applied. Further successively during the non-selection phase, the drive voltage is erased rapidly, and the orientation state accordingly transits to the P-orientation. The P-orientation is maintained until the next drive cycle.

On the other hand, according to the conventional drive scheme, each of the voltages specific to the periods described above is applied to the scanning lines one after another. Since this scheme is well-known, a detailed description of a drive cycle, applied voltages, and the like according to this scheme will be omitted herefrom.

Referring again to FIG. 8, the CPU 44 monitors in a step S110 whether a drive mode is selected on the drive mode selection screen or not. If a drive mode is selected, an identifier for identifying the selected drive mode is stored in the RAM 45. The CPU 44 takes the processing further forward to a step S120.

In the step S120, the CPU 44 determines whether the drive mode has been changed from a low-speed drive mode as a default mode to a high-speed drive mode or not. If the mode has been changed to the high-speed drive mode, the CPU 44 takes the processing forward to the step S130. If the drive mode has not been changed to the high-speed drive mode, the CPU 44 takes the processing forward to a step S140.

In the step S130, the CPU 44 supplies a signal for setting the load controller 33 into a high-load state, to the magnetic force control circuit 33c via the I/O controller 48. Upon receiving the supplied signal, the magnetic force control circuit 33c supplies the electromagnet 33b with electric power which is necessary to apply a load denoted by the solid curve B in FIG. 7 to the rotary knob 31.

In the step S140, the CPU 44 supplies a signal for setting the load controller 33 into a low-load state, to the magnetic force control circuit 33c via the I/O controller 48. Upon receiving the supplied signal, the magnetic force control circuit 33c supplies the electromagnet 33b with electric power which is necessary to apply the load denoted by the chain curve C in FIG. 7 to the rotary knob 31.

Figure 13:
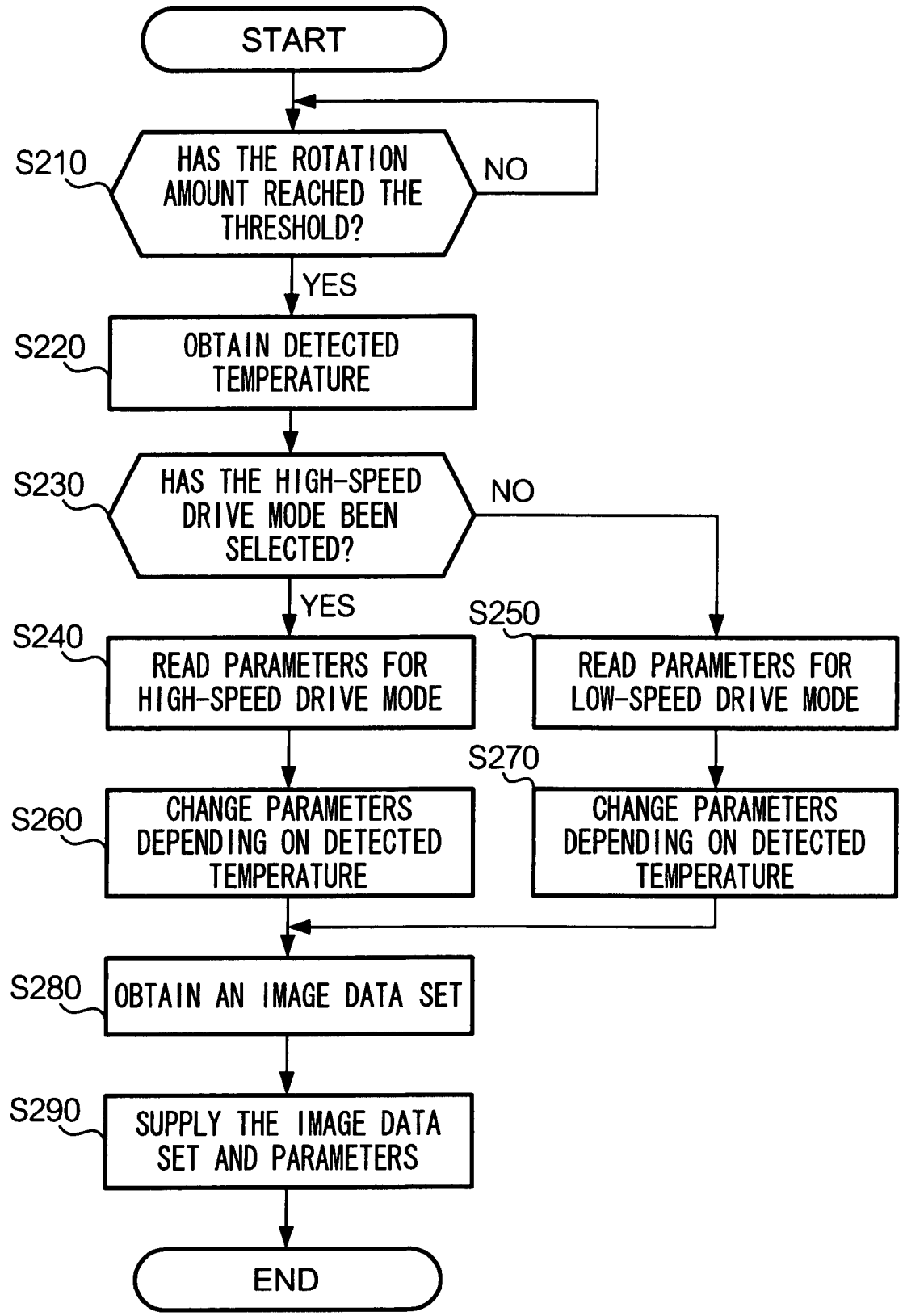
FIG. 13 is a flowchart showing image switching processing.

FIG. 13 is a flowchart showing image switching processing. While a series of processing shown in FIG. 13 is executed, the I/O controller 48 continues supplying the CPU 44 with signals indicative of the rotation amount and rotation direction which are detected by the rotary encoder 32.

In the step S210, the CPU 44 monitors whether or not the rotation amount indicated by the signal supplied from the I/O controller 48 reaches an angle as a threshold for switching images, which is stored in the RAM 45. After the rotation amount reaches the threshold, the CPU 44 takes the processing forward to a step S220.

In the step S220, the CPU 44 obtains a digital signal indicative of a temperature detected by the temperature sensor 91 from the ADC 41.

In a step S230, the CPU 44 refers to identifiers stored in the RAM 45 to determine whether the low-speed drive mode or the high-speed drive mode has been selected.

If it is determined in the step S230 that the high-speed drive mode has been selected, the CPU 44 reads parameters for the high-speed drive mode from a table in the ROM 46. The "parameters for the high-speed drive mode" are prepared in advance for the high-speed drive mode, and waveforms for black and white (e.g., thresholds of $V_1$ to $V_4$ shown in FIG. 10) are decided. Otherwise, if it is determined that the low-speed drive mode has been selected, the CPU 44 reads parameters for the low-speed drive mode from the table in the ROM 46.

The "parameters for the low-speed drive mode" are prepared in advance for the low-speed drive mode, and waveforms for black and white (e.g., thresholds of $V_1$ to $V_4$ shown in FIG. 10) are decided.

The thresholds indicated as parameters stored in the table have been obtained on the basis of actual measurement, as values which cause cholesteric liquid crystal at a reference temperature (e.g., 25° C.) to transit between orientation states.

After reading the parameters, the CPU 44 changes the parameters depending on a temperature detected (S260). Specifically, the thresholds $V_1$ and $V_2$ applied during the selection phase shown in FIG. 10 are changed depending on the detected temperature.

The reason why the thresholds are changed depending on the detected temperature will now be described with reference to FIG. 14.

Figure 14:
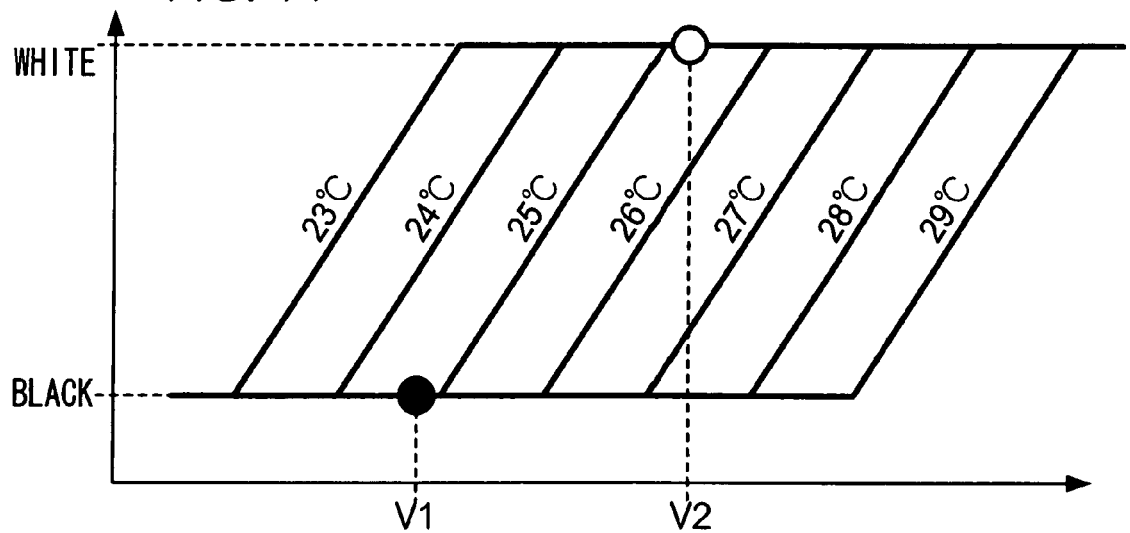
FIG. 14 schematically shows relationships between applied voltages and reflections.

FIG. 14 schematically shows relationships between selected voltages and reflectances of cholesteric liquid crystal. The horizontal axis represents voltages while the vertical axis represents reflectances. Each of the reflectances is of a relative brightness, assuming that a reflective brightness of a standard white plate as a reference is 100%. A higher reflectance means that the cholesteric liquid crystal is oriented closer to the F-orientation and looks more blackish. As shown in FIG. 14, a voltage with which the reflectance of cholesteric liquid crystal transits to 100% (white) and a voltage with which the reflectance transits to 0% (black) shift to the higher voltage side as the temperature increases. Inversely, both the voltages shift to the lower voltage side as the temperature decreases. Thus, the reflectance-voltage characteristic of the cholesteric liquid crystal depends on the temperature. Accordingly, this embodiment utilizes a structure in which drive parameters are changed depending on a detected temperature.

Referring again to FIG. 13, in a step S270, the CPU 44 changes parameters read out in the step S250, depending on the detected temperature as well.

After the parameters are changed in the step S260 or S270, the CPU 44 specifies an image data set to be displayed on the cholesteric liquid crystal panel 11 from among a series of image data sets stored in the ROM 46, and obtains the specified image data. The image data set is specified in a manner described below. At first, the ROM 46 stores in advance plural image data sets, respectively related to unique file names. In the step S280, an image file related to a file name ranked immediately before or after the file name of the image being now displayed in the order of referencing file names is specified, provided that the file names are arranged in ascending order. Whether the image file to be specified should be related to a file name immediately before or after the file name of the image being now displayed is determined depending on which of a forward or backward rotation directions the rotary knob 31 is turned in.

In the step S290, the CPU 44 supplies the main display drive control circuit 47 with the image data set obtained in the step S280 and the parameters changed in the step S260 or S270. Upon reception of the supplied image data set and the parameters, the main display drive control circuit 47 specifies waveforms of drive voltages which cause transition of the cholesteric liquid crystal, in accordance with the parameters. Based on the image data, the main display drive control circuit 47 also specifies colors of pixels on each main scanning line of an image to be displayed. Further, the main display drive control circuit 47 supplies the segment power generation circuit 42 and the common electrode power generation circuit 43 sequentially with control signals for respectively causing transitions of the orientation states of the electro-optical units 16a corresponding to the pixels. In this manner, the orientation states of the electro-optical units 16a transit, line by line, according to either the DDS or the conventional drive scheme. When the transitions are completed for all lines, rewrite of the image is completed.

In the first embodiment as described above, the rotational load applied to the rotary operator unit as an operator unit for instructing switching of an image displayed on the main display is switched depending on whether a high-speed drive mode or low-speed drive mode is selected. Thus, loads corresponding to drive modes can be applied through the rotary operator unit.

2. Second Embodiment

The second embodiment of the invention will now be described. In the second embodiment, the information processing device has a sub-display (second display device) separate from a main display (first display device). The sub-display uses a different display medium from cholesteric liquid crystal, for e.g., a display medium having a different writing speed. An operation target to be operated by the rotary operator unit can be selected from the main display and the sub-display. Of the rotary operator unit, an angular size as a threshold at which images are switched is controlled depending on whether the operation target is the main display or the sub-display. Further, the light blinks each time a rotation of the rotary operator unit is detected as the rotary operator unit is operated. As a result, improved visibility can be attained when users operate the rotary operator unit.

The main display 10 is a primary display of an electronic paper and has effective features such as high definition capability and low power consumption. To make full use of the effective features, the main display 10 is usually utilized to present a main document so that the user can thoroughly read the main document. However, the main display 10 achieves only a low rewrite speed. Therefore, the rewrite of a display is executed for the entire page (or the entire part of a page), and scrolling is not carried out. On the other hand, the sub-display 50 is a subsidiary display and is capable of high-speed rewrite. Therefore, the sub-display 50 is usually utilized to present supplemental information such as an operation menu, a file search window, or bibliographic information concerning a document displayed on the main display. Since the sub-display is capable of high-speed rewrite, scrolling may be allowed depending on the operations of the rotary operator unit. However, the sub-display 50 has less effective features such as low resolution, high power consumption, and a small screen size, and is therefore not desirable for display of a main document.

Figure 15:
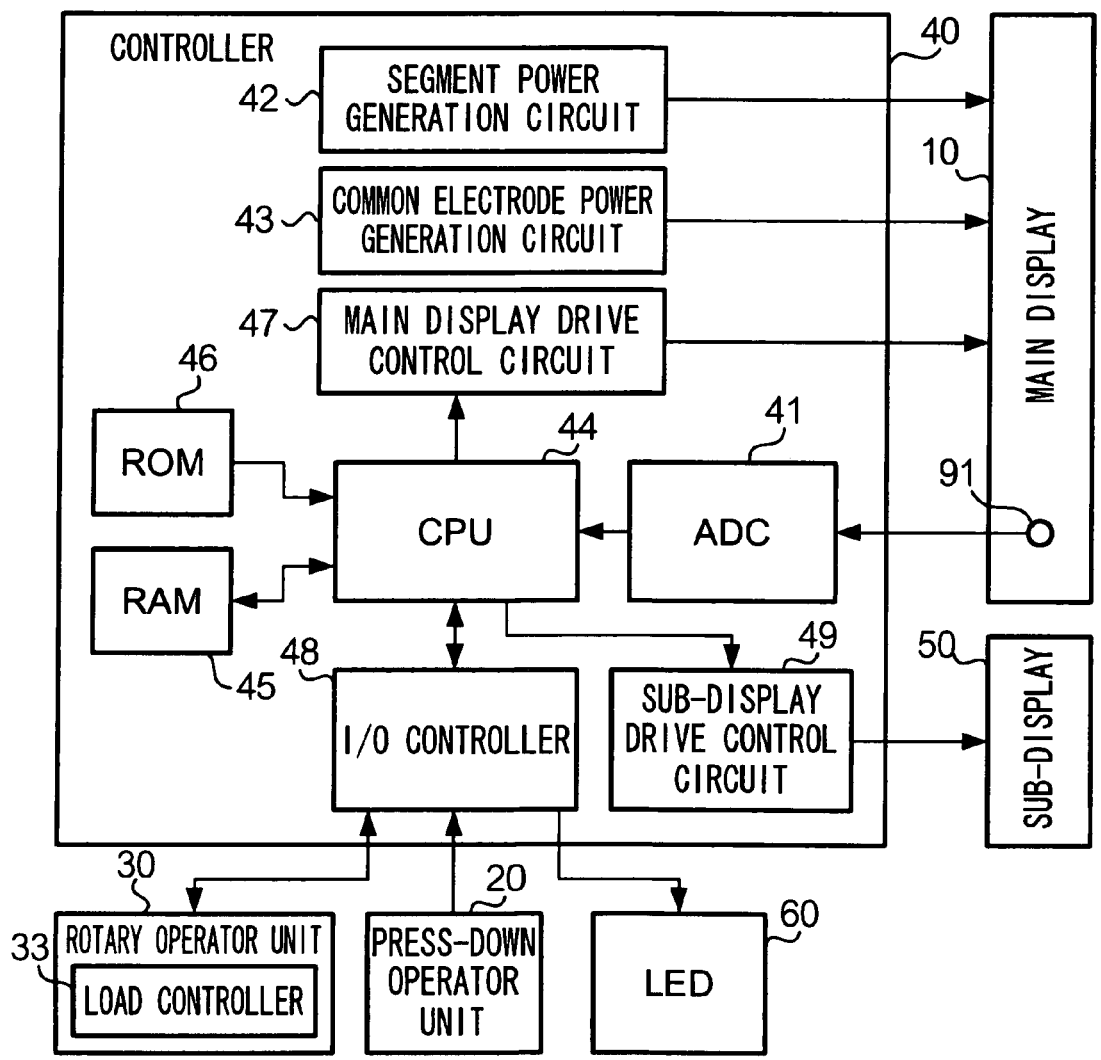
FIG. 15 shows a schematic hardware structure of a liquid crystal display device.
Figure 16:
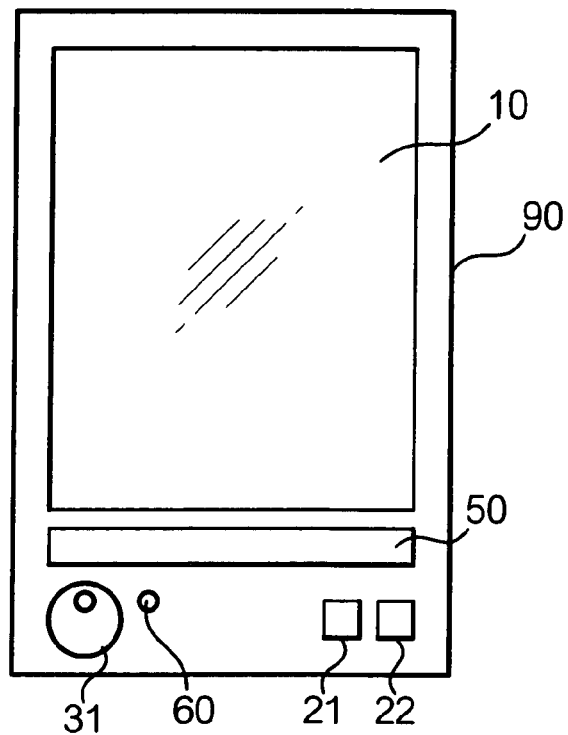
FIG. 16 shows an appearance of the liquid crystal display device.

FIG. 15 shows a schematic hardware structure of the information processing device according to the second embodiment. FIG. 16 shows an appearance of the information processing device. As shown in FIG. 15, this information processing device has a main display 10, a press-down operator unit 20, a rotary operator unit 30, a controller 40, a sub-display 50, and a LED 60. The controller 40 includes a sub-display drive control circuit 49 in addition to an ADC 41, a segment power generation circuit 42, a common electrode power generation circuit 43, a CPU 44, a RAM 45, a ROM 46, a main display drive control circuit 47, and an I/O controller 48. Details of the structure of the main display 10 are the same as those described in the first embodiment and will be omitted from the figures.

The LED 60 is an optical unit which emits light upon reception of a signal supplied from the I/O controller 48. As shown in FIG. 16, the LED 60 is exposed to the outside of the casing 90 of the display device.

The sub-display 50 differs from the main display 10 in that the sub-display utilizes a display medium (e.g., nematic liquid crystal) which has superior resistance against temperature changes and a superior drive speed to those of cholesteric liquid crystal. As shown in FIG. 2, an upper glass substrate of a liquid crystal panel of the sub-display 50 is exposed to the outside through an opening part in the casing 90 of the display device.

The sub-display drive control circuit 49 in the controller 40 supplies the sub-display 50 with a control signal thereby to display an image on the liquid crystal panel.

In the information processing device according to the second embodiment, the structure of the rotary operator unit 30 differs from that of the first embodiment. The structure of the rotary operator unit 30 in the second embodiment will be described in detail with reference to FIGS. 17 and 18.

Figure 17:
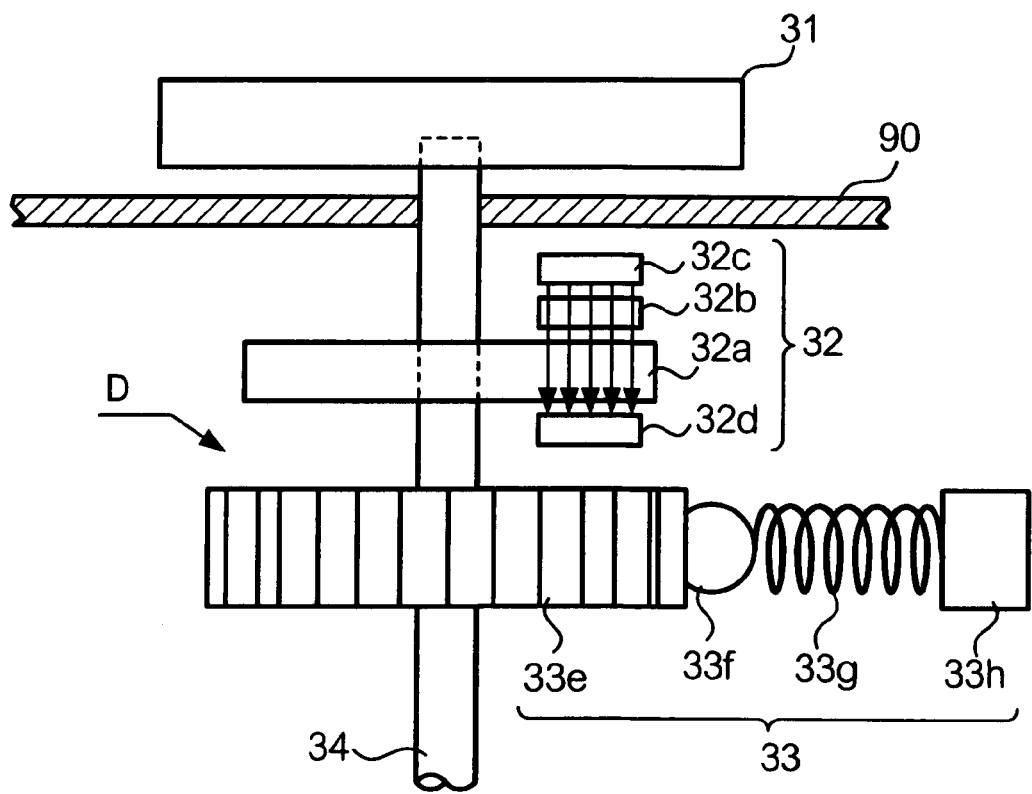
FIG. 17 shows a structure of a rotary operator unit.
Figure 18A:
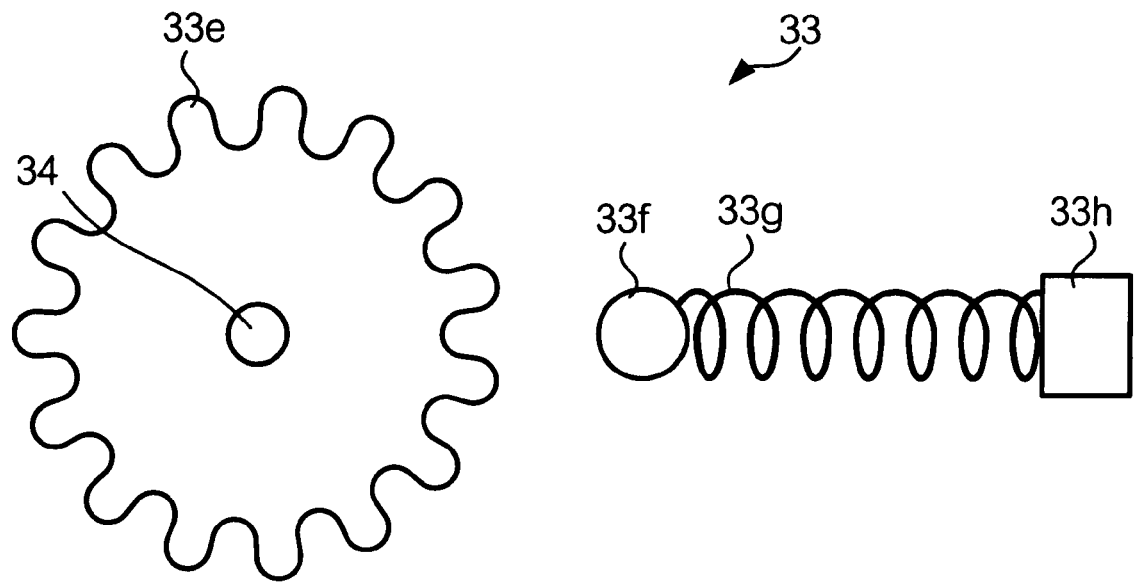
FIGS. 18A and 18B also show a structure of the rotary operator unit.

FIG. 17 is a side view of the rotary operator unit 30. FIG. 18 are top views showing a face denoted by an arrow D in FIG. 17. The rotary knob 31 and rotary encoder 32 which constitute the rotary operator unit 30 have the same structures as those in the first embodiment, which will be omitted from the detailed description below.

A load controller 33 shown in the figures includes a gear 33e, a hard sphere 33f, a spring 33g, and an actuator 33h. The gear 33e has a through hole in its center. A rotary shaft 34 is inserted in the through hole, and the gear 33e is fixed to the rotary shaft 34. The gear 33e and the hard sphere 33f are connected through the spring 33g. The actuator 33h moves in a direction toward the gear 33e and in an opposite direction, thereby adjusting the energizing force with which the hard sphere 33f is pressed against the side face of the gear 33e.

Figure 18B:
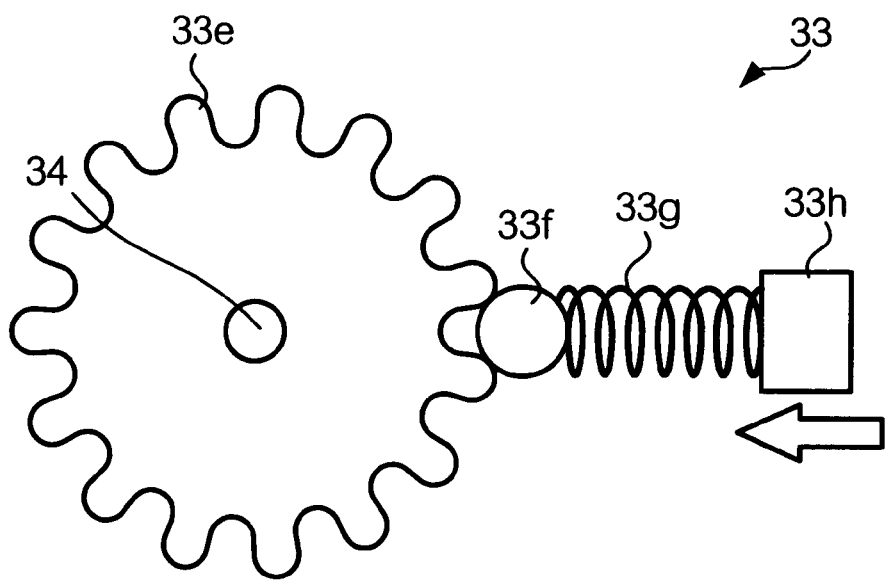

As the actuator 33h moves away from the gear 33e in the opposite direction, the hard sphere 33f perfectly takes off from the side wall of the gear 33e. Then, the load acting on the rotating rotary knob 31 becomes substantially zero. As the actuator 33h moves further from this state in the direction toward the gear 33e, the hard sphere 33f makes contact with the side wall of the gear 33e. Then, a load which hinders rotation is applied from the time point when the hard sphere 33f engages in one of the splines (or grooves). As the actuator 33h further moves in the direction toward the gear 33e, as shown in FIG. 18B, the rotational load applied to the rotary knob 31 becomes heavier since the rotary knob 31 is connected to the gear 33e through the rotary shaft 34.

An image switching processing which characterizes the second embodiment will now be described.

Figure 19:
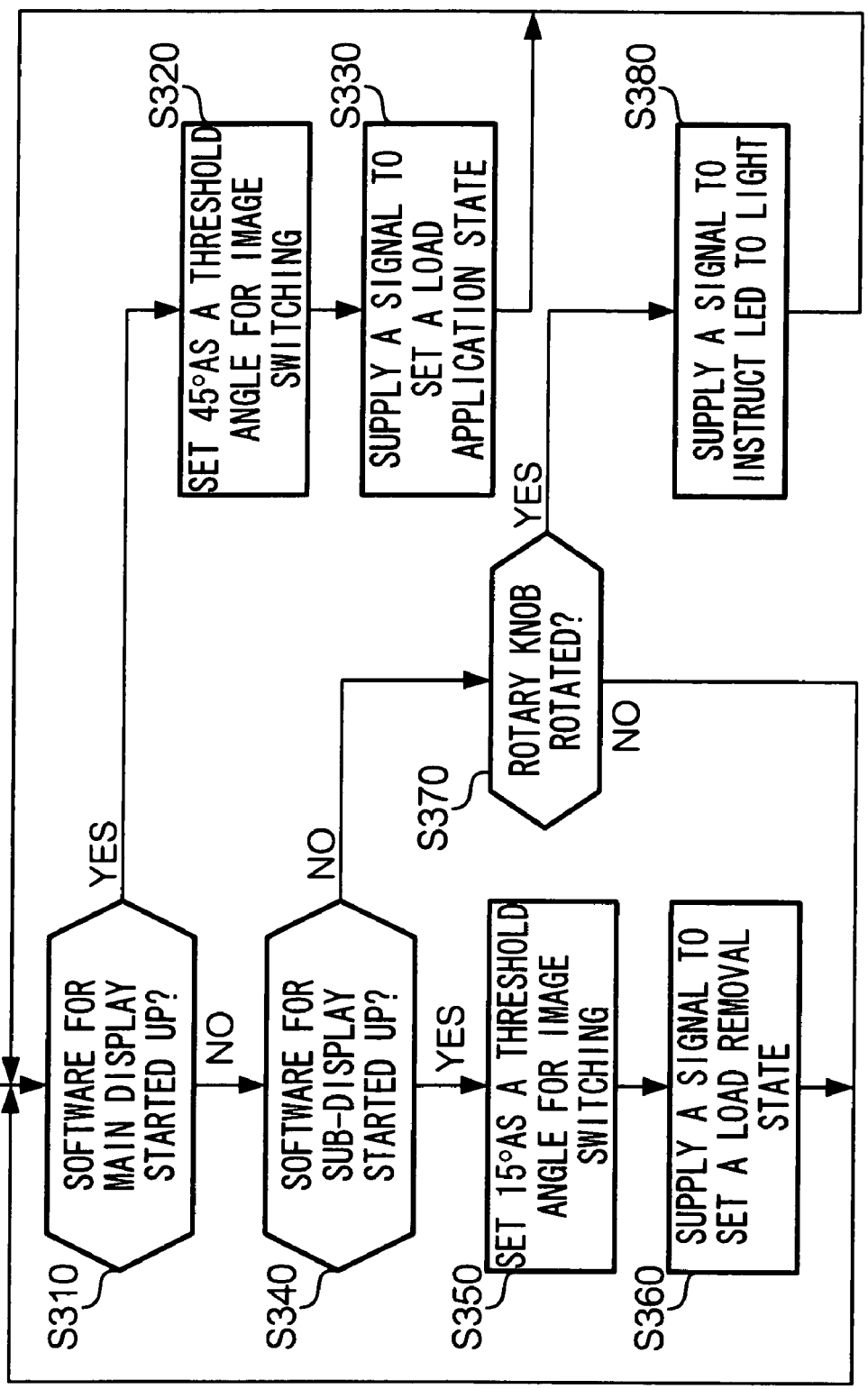
FIG. 19 is a flowchart showing image switching processing.

FIG. 19 is a flowchart showing the image switching processing. While a series of processings shown in the figure is carried out, the I/O controller 48 continues supplying the CPU 44 with signals indicative of a rotation amount and a rotation direction of the rotary knob 31, which are detected by the rotary encoder 32. The information processing device uses different software programs respectively for controlling the main display 10 and the sub-display 50 is given lower priority than the main display 10.

In a step S310, the CPU 44 determines whether the software program for controlling the main display 10 has been started up or not. If the software program is determined as having been started up (S310: YES), the CPU 44 sets an angle of 45 degrees as a threshold for switching images, which is stored in the RAM 45. Thereafter, each time when the angle of 45 degrees is reached by the rotation amount of the rotary knob 31 which is specified based on the signal supplied from the I/O controller 48, an image data set to be displayed on the cholesteric liquid crystal panel 11 is obtained from a series of image data sets stored in the ROM 46 and is then supplied to the main display drive control circuit 47. A procedure for obtaining the image data set is the same as that in the step S280 shown in FIG. 13. Upon reception of the supplied image data set, the main display drive control circuit 47 supplies the segment power generation circuit 42 and the common electrode power generation circuit 43 with control signals for causing the electro-optical units 16a to transit their own orientation states in accordance with the image data set, thereby rewriting the image now displayed on the cholesteric liquid crystal panel 11.

After setting the threshold for switching images to 45 degrees, the CPU 44 supplies the actuator 33h with a signal for setting the load controller into a load application state, via the I/O controller 48, in a step S330. Upon reception of the supplied signal, the actuator 33h moves in the direction toward the gear 33e. As the actuator 33h moves in this way, a load for hindering rotation of the rotary knob 31 is applied. After supplying the signal to the actuator 33h, the CPU 44 returns the processing to the step S310.

If it is determined in the step S310 that the software program for controlling the main display 10 has not been started up (S310: NO), the CPU 44 determines whether the software program for controlling the sub-display 50 has been started up or not, in the step S340.

If the software program for controlling the sub-display 50 is determined as having been started up (S340: YES), the CPU 44 sets 15 degrees as the angle of the threshold for switching images, which is stored in the RAM 45. Thereafter, each time the angle of 15 degrees as the threshold is reached by the rotation amount of the rotary knob 31 which is specified based on the signal supplied from the I/O controller 48, an image data set to be displayed on the cholesteric liquid crystal panel 11 is obtained from the series of image data sets stored in the ROM 46 and is then supplied to the sub-display 50.

After setting the threshold for switching images to 15 degrees, the CPU 44 supplies the actuator 33h with a signal for setting the load controller into a load removal state, via the I/O controller 48, in a step S360. Upon receiving the supplied signal, the actuator 33h moves in the opposite direction away from the gear 33e. As the actuator 33h moves in this way, the load for hindering rotation of the rotary knob 31 is removed. After supplying the signal to the actuator 33h, the CPU 44 returns the processing to the step S310.

If the software program for controlling the sub-display 50 is determined as not having been started up (S340: NO), the CPU 44 waits for supply of a signal from the I/O controller 48. If a signal indicative of a rotation angle is supplied (S370 YES), the CPU 44 supplies a signal indicating lighting-up of the LED 60 to the LED 60 via the I/O controller 48, in a step S380. Upon supply of this signal, the LED 60 lights up for a predetermined time period. In this manner, the LED blinks each time the rotary encoder 32 of the rotary operator unit 30 detects rotation of the rotary knob 31.

In the second embodiment as described above, the threshold for switching images is controlled depending on whether the operation target is the main display 10 or the sub-display 50. Although the sub-display has a faster drive speed than the main display, the threshold for switching images is controlled depending on the operation target. Accordingly, the rotary operator unit may have loads respectively corresponding to operation targets.

3. Further Embodiments

The invention may be practiced in various forms of modifications as follows. Two or more of the following modifications can be utilized in combination with the first or second embodiment.

In the first embodiment, the electromagnetic force for hindering rotation of the rotary knob is increased in the high-speed drive mode in which the drive speed of liquid crystal is fast. In the low-speed drive mode in which the drive speed of liquid crystal is slow, the electromagnetic force is reduced. As a result, an operation feel of the rotary knob varies following the drive speed of liquid crystal. In this respect, the configuration of the first embodiment can be modified so that the angle as a threshold for switching images is switched depending on whether the high-speed drive mode or the low-speed drive mode is selected.

In the second embodiment, the rotation angle as a threshold for switching images is reduced when the sub-display is operated by rotation of the rotary knob. On the other hand, the rotation angle is increased when the main display is operated by rotation of the rotary knob. In this manner, the operation feel of the rotary knob varies following the drive speed of liquid crystal. In this respect, the configuration of the second embodiment can be modified so as to utilize an electromagnet as in the first embodiment. Specifically, magnifications of the electromagnetic force for hindering rotation of the rotary knob can be switched between the time when the sub-display is an operation target and when the main display is an operation target.

In the second embodiment, operation targets to be operated by the rotary knob are two of the main display and sub-display. However, three or more displays can be operation targets. Specifically, the configuration of the second embodiment can be modified so that three or more displays are operated by one rotary operator unit. In this case, the threshold value for switching images can be switched depending on which of the three or more displays the operation target is which is now being operated.

The above embodiments have been described referring to examples in which the rotary encoder of the load controller is an absolute rotary encoder. However, an incremental rotary encoder can substitute for the absolute rotary encoder. In case of an incremental rotary encoder, a relative rotation amount can be detected although an absolute angle of rotation of the rotated rotary knob cannot be detected. In this case, the configuration may be modified so that an image file related to a file name ranked immediately before or after the file name of the image being now displayed in the order of referencing file names is specified each time the relative rotation amount exceeds a threshold.

In the above embodiments, a series of image data sets which can be displayed on the liquid crystal panel are stored in a ROM. However, plural image data sets may be stored in advance in a different type of storage device such as a flash ROM or hard disk, and any of the plural image data sets can be specified and displayed on the liquid crystal panel, in accordance with an operation on the rotary operator unit.

In the second embodiment, a LED is exposed from the casing of the liquid crystal display device. By blinking of the LED, users are notified that the rotation amount of the rotary knob exceeds a threshold angle. In this respect, there can be an in-built loudspeaker instead of the LED, and users can then be notified of an excess of the rotation amount of the rotary knob over a threshold angle by a beep or click sound from the loudspeaker.

In the second embodiment, the threshold for switching images is set to 45 degrees when the main display is an operation target of the rotary operator unit. When the sub-display is an operation target of the rotary operator unit, the threshold for switching images is set to 15 degrees. However, the angular thresholds are not limited to these degrees. Thresholds other than these degrees can be set as long as the threshold to be set when the main display is an operation target is greater than another threshold to be set when the sub-display is an operation target.

In the first embodiment, the load applied to the rotary operator unit is switched between two values respectively corresponding to the high-speed drive mode and the low-speed drive mode. However, the drive speed of a liquid crystal may vary depending on the data amount of an image data set as a target to be displayed. Accordingly, the configuration may be modified so that the load is finely adjusted afterward in accordance with the data amount of an image data set as a target to be displayed. A structure and operation of such a modification will now be described conceptually below. That is, "a rotary operator unit includes: a display medium that displays information; a storage unit that stores a plurality of image data sets; a selection unit that selects a drive mode of the display medium; a rotary unit that rotates about an axis; a rotation amount detection unit that detects a rotation amount of the rotary unit; a display controller that reads out an image data set specified depending on the rotation amount detected, from the storage unit, and causes the display medium to display the image data set specified; and a load application unit that applies a load to the rotary unit, to hinder rotation of the rotary unit, specifies a reference amount for the load to apply, in accordance with the drive mode selected by the selection unit, and adjusts the reference amount specified, depending on a data amount of the image data set read out."

In the second embodiment, the image to be displayed on the main display 10 is not limited to an image expressing a main document. For example, supplemental information such as a menu screen for operating the information processing device can be displayed on the main display 10. In this case, the load may be switched in accordance with the type of an image to be displayed, for e.g., the load is increased when displaying a document while the load is reduced when displaying a menu.

The loads applied to the rotary operator unit are not limited to those described in the first and second embodiments. Specifically, the "load" of the operator unit is an amount of work which is required to rewrite a unit information amount of a displayed image in a display device as an operation target. Since $W=F \times \Delta x$ (here, W, F and $\Delta x$ denotes work, force and displacement, respectively), the "load" of the operator unit refers to at least one of the force and displacement, which is required for rewriting a unit information amount of a displayed image. In other words, in any embodiment or modification, any type of information processing device may be used as far as the information processing device controls at least one of the force and the displacement amount, depending on display rewrite time per unit information amount in a display device, wherein the force is required for moving the rotary unit by a unit displacement amount, and the displacement amount is required for triggering an instruction to rewrite display.

The above embodiments have been described with reference to examples in which the operator unit is of a rotary type. However, the operator unit is not limited to a rotary type. An operator unit having a structure using a slidable lever or a so-called trackball or an operator unit having any other type of structure can be used as far as the operator unit outputs a signal corresponding to displacement of the operator unit from a reference point (e.g., a rotation axis, an end of a slidable lever, the center of a trackball, etc.)

Also, the above embodiments have been described with reference to examples in which a cholesteric liquid crystal layer is used as the display medium in a display device. However, the display medium is not limited to cholesteric liquid crystal. For example, an electrophoretic medium or any other type of memorable display medium can be used. The number of displays included in one information processing device is not limited to those exemplified in the above embodiments. For example, in the first embodiment, the information processing device can include two or more displays. In this case, at least one of the plural display devices needs to be driven in plural drive modes having respectively different rewrite speeds. In the second embodiment, for example, the information processing device can include three or more displays. In this case, at least one of the plural display devices needs to utilize a display medium having a different rewrite speed than those of the other displays.

What is claimed is:

1. An information-processing device comprising:
   at least one display device;
   an operator unit configured to be displaced from a reference point;
   a displacement detection unit configured to detect a displacement amount of the operator unit;
   a signal supply unit configured to supply the at least one display device with a control signal for changing an image displayed on the at least one display device, depending on the displacement amount detected by the displacement detection unit;
   a mechanical force determining unit configured to determine a mechanical force applied to the operator unit, depending on a display rewrite time period per unit information amount in the at least one display device, the mechanical force being determined to be a first mechanical force when the display rewrite time period is a first time period, the mechanical force being determined to be a second mechanical force when the display rewrite time period is a second time period, the second mechanical force being less than the first mechanical force, the second time period being shorter than the first time period, the second time period being greater than zero; and
   a mechanical force providing unit configured to provide the mechanical force determined by the mechanical force controller, to the operator unit, the mechanical force preventing the displacement of the operator unit, the first mechanical force being applied when the information-processing device is turned on.

2. The information-processing device according to claim 1, further comprising
   a plurality of display devices having respectively different display speeds, wherein
   the signal supply unit is configured to supply the control signal to one of the plurality of display devices, and
   the mechanical force controller is configured to control the mechanical force applied to the operator unit, depending on the one of the plurality of display devices as a destination to which the control signal is supplied.

3. The information-processing device according to claim 2, wherein the mechanical force controller is configured to control the mechanical force applied to the operator unit so that the mechanical force decreases as a rewrite speed of the one of the plurality of display devices, as the destination, increases.

4. The information-processing device according to claim 1, wherein
   one of the at least one display device is configured to be driven in a plurality of drive modes respectively having different display rewrite time periods per unit information amount, and
   the mechanical force controller is configured to control the mechanical force applied to the operator unit, depending on one of the plurality of drive modes in which the one of the at least one display device is driven.

5. The information-processing device according to claim 4, wherein the mechanical force controller is configured to control the mechanical force applied to the operator unit so that the mechanical force applied to the operator unit decreases as a rewrite speed of the one of the at least one display device which is driven in the one of the plurality of drive modes increases.

6. The information-processing device according to claim 4, wherein
   the one of the at least one display device includes a display medium using cholesteric liquid crystal, and
   the plurality of drive modes includes drive modes based on a DDS (Dynamic Drive Scheme) and a conventional scheme.

7. The information-processing device according to claim 1, wherein
   the mechanical force is a force which hinders displacement of the operator unit.

8. The information-processing device according to claim 1, wherein
   the mechanical force is a displacement amount which is required to trigger a rewrite of a unit information amount of the display on the display device.

9. The information-processing device according to claim 1, wherein the signal supply unit is configured to output an instruction about the rewrite of the display on the at least one display device each time the displacement amount detected by the displacement detection unit exceeds a threshold.

10. The information-processing device according to claim 1, wherein the at least one display device includes a display medium using cholesteric liquid crystal.

11. The information-processing device according to claim 1, further comprising a light emitting unit configured to emit light, synchronized with timing at which the control signal is supplied to the at least one display device.

12. The information-processing device according to claim 1, further comprising an audio output unit configured to output a sound, synchronized with timing at which the control signal is supplied to the at least one display device.

13. The information-processing device according to claim 1, wherein
   the operator unit is of a type which turns about an axis, and
   the displacement amount is a rotation amount of the operator unit.

14. A method for controlling an information-processing device having at least one display device and an operator unit that is displaced from a reference point, the method comprising:
   detecting, by a displacement detection unit, a displacement amount of the operator unit;
   supplying, by a signal supply unit, the at least one display device with a control signal for changing an image displayed on the at least one display device, depending on the displacement amount detected by the displacement detection unit;
   determining, by a mechanical force determining unit, a mechanical force applied to the operator unit, depending on a display rewrite time period per unit information amount in the at least one display device, the mechanical force being determined to be a first mechanical force when the display rewrite time period is a first time period, the mechanical force being determined to be a second mechanical force when the display rewrite time period is a second time period, the second mechanical force being less than the first mechanical force, the second time period being shorter than the first time period, the second time period being greater than zero; and
   providing, by a mechanical force providing unit, the mechanical force determined by the mechanical force controller, to the operator unit, the mechanical force preventing the displacement of the operator unit, the first mechanical force being applied when the information-processing device is turned on.

* * * * *